United States Patent [19]

Nicholls

[11] 4,052,088
[45] Oct. 4, 1977

[54] VEHICLE SUSPENSION UNITS

[75] Inventor: Lawrence George Nicholls, Tyseley, England

[73] Assignee: Girling Limited, Birmingham, England

[21] Appl. No.: 539,605

[22] Filed: Jan. 8, 1975

[30] Foreign Application Priority Data

July 10, 1974 United Kingdom ............... 30627/74

[51] Int. Cl.² .......................................... B60G 11/30
[52] U.S. Cl. ............................... 280/708; 267/64 R
[58] Field of Search ............ 280/124 F, 702, 708; 267/64 R, 64 A, 64 B

[56] References Cited

U.S. PATENT DOCUMENTS

| | | | |
|---|---|---|---|
| 3,272,495 | 9/1966 | Axthammer | 267/64 B |
| 3,854,710 | 12/1974 | Nicholls | 280/124 F |
| 3,869,861 | 3/1975 | Case | 267/64 R |
| 3,879,023 | 4/1975 | Pearce | 267/64 R |
| 3,880,446 | 4/1975 | Müller | 280/124 F |

*Primary Examiner*—Philip Goodman
*Assistant Examiner*—John A. Carroll
*Attorney, Agent, or Firm*—Scrivener, Parker, Scrivener & Clarke

[57] ABSTRACT

A suspension unit comprises a cylinder, a diaphragm within the cylinder forming an end wall a pressure space in the cylinder filled with a mixture of fixed masses of gas and liquid and a damping piston working in the pressure space with a piston rod extending sealingly through one end of the cylinder. The position of the diaphragm is variable to adjust the pressure in the pressure space.

3 Claims, 1 Drawing Figure

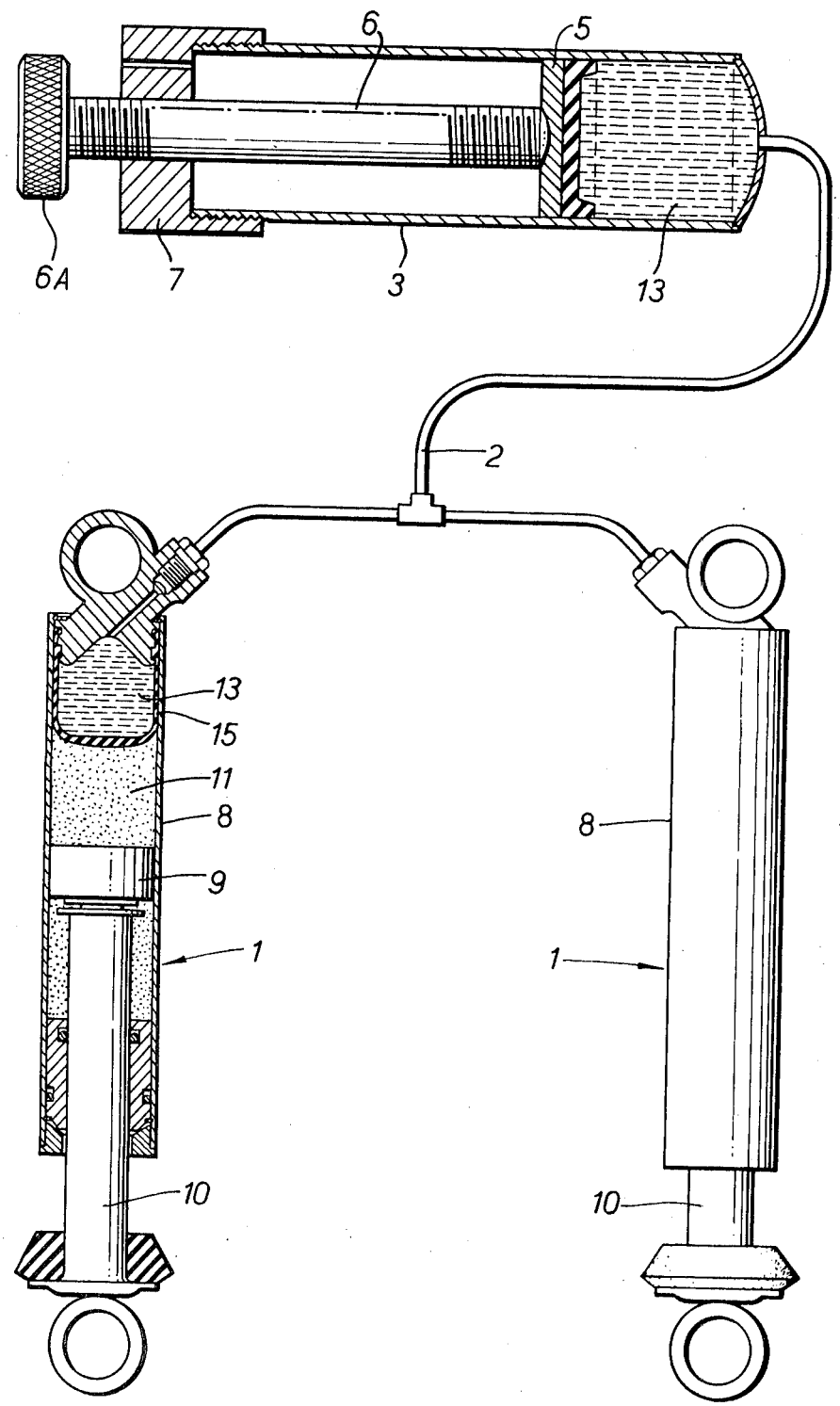

VEHICLE SUSPENSION UNITS

This invention relates to vehicle suspension units and to suspension systems incorporating such units.

Previously proposed suspension units comprise a damping piston slidable in a cylinder and having a piston rod extending sealingly through one end of the cylinder. The piston works in a lower chamber filled with liquid and being separated from an upper chamber having a fixed mass of gas by a separating member. A further piston is movable within the cylinder to vary the pressure within the unit and thus the force acting on the damping piston.

In use the suspension unit is connected between the sprung and unsprung parts of the vehicle so that the variation in pressure of the liquid in the chamber varies the normal relative positions of the piston and cylinder and thus the "height" of the unit to compensate, for example, for changes in vehicle loading.

The piston rod of such suspension unit has to withstand large end loads and consequently has a substantial cross-sectional area, with the result that it displaces a considerable amount of fluid during a compression stroke.

In a particular previously proposed unit the separator member is a free piston slidable in the cylinder. Because of the large displacement of fluid by the piston rod the separator piston has to travel at a substantial speed over a relatively large distance to accommodate normal suspension movement. This causes severe wear and sealing problems.

Furthermore, the separator piston has to satisfy the requirements of being easily movable to overcome any problems of hysteresis and of having a gas-tight seal. These two requirements are very difficult to achieve for the large-diameter separator pistons.

The aim of the present invention is to obviate the above-mentioned problems.

In accordance with one aspect of the present invention there is provided a suspension system for a vehicle having a sprung part and an unsprung part, comprising a suspension unit having a cylinder for connection to one of said vehicle parts and a damping piston carrying a piston rod extending sealingly through one end of said cylinder for connection to the other of said vehicle parts, means defining a first pressure space within said unit, said damping piston working in said first pressure space, means defining a second pressure space, a partition wall sealingly separating said pressure spaces said first space containing a mixture of gas and liquid and said second space containing liquid and adjusting means for adjusting the pressure in said spaces, wherein said partition wall is in the form of a diaphragm secured at its periphery to said cylinder.

In accordance with another aspect of the invention, there is provided a suspension unit comprising a cylinder, means defining a pressure space within said cylinder filled with a mixture of fixed masses of gas and liquid, said means including a selectively movable end wall, a damping piston working in said pressure space, a piston rod fast with said damping piston and extending sealingly through one end of said cylinder, and means for selectively varying the position of said end wall to adjust the pressure in said pressure space, wherein said end wall is constituted by a diaphragm.

A suspension system in accordance with the invention will now be described, by way of example, with reference to the accompanying drawing which shows an elevational view of the suspension system, partly in section.

The suspension system is particularly suitable for use with motor cycles and comprises a pair of piston and cylinder suspension units 1. Two units are located, in use, one on each side of the motor cycle, each unit being connected between the sprung and unsprung parts of the motor cycle. Each unit 1 is connected by common piping 2 to an accumulator or reservoir 3 having a pressurising piston 5 axially movable therein. A mechanical pressure-varying device comprises a screwed rod 6 threaded through a fixed end cap 7 of the reservoir 3 and having at its outer end a hand wheel 6A. The inner end of the rod 6 engages the piston 5 so that the piston 5 is manually movable by the rod 6. A possible variation would allow the piston 5 to be moved automatically in response to vehicle loading.

Each unit 1 comprises a cylinder 8 within which is sealingly slidable a damping piston 9 having a piston rod 10 extending sealingly through one end of the cylinder. The piston 9 works in a chamber 11 which forms a first pressure space and which contains a dispersion of gas and a liquid, such as oil. Movement of the damping piston 9 within the chamber may be damped by restricting the flow of the fluid from one side of the piston to the other by any suitable means which may, for example, be a valving arrangement or a controlled leakage arrangement.

The chamber 11 has a movable end wall constituted by a separating diaphragm 15 the periphery of which is held between the cylinder 8 and an end closure 16. The diaphragm 15 separates the chamber 11 from a chamber 13 formed between piston 5 and diaphragm 12, the chamber 13 constituting a second pressure space and containing only liquid.

In use, rotation of the screw rod 6 varies the pressure of the liquid in the chamber 13 and, through the separating diaphragm 15, the pressure in the chamber 11. Thus the pressure force acting on the damping piston 9 is varied to adjust the "height" of the unit i.e. the relative positions of the piston 9 and cylinder 8.

Variations in the pressure acting on the movable wall 15 act to vary the effective height or length of the unit 1 under constant load conditions or to keep the effective height constant under different steady load conditions.

Since the compressible gas is mixed with oil in the chamber 11 and the chamber 13 is filled with substantially incompressible hydraulic fluid, the movable end wall 15 moves substantially only when adjustment takes place, so that hysteresis is minimal.

The use of the diaphragm 15 instead of an equivalent piston has many advantages; that the seal about the diaphragm periphery is superior to a sliding piston seal; that the diaphragm is lighter and responds more quickly to changes of pressure in the chamber 13; and that the diaphragm is cheaper than the equivalent piston. Since the diaphragm is moved only when there is a substantial change in vehicle loading, its use may be very infrequent for some vehicle users and in this situation a sliding piston seal may seize or be damaged when it its brought into use, whereas the diaphragm is not subject to such seizure or damage. In each of the above-described units the diaphragm 15 does not move substantially during normal operation and spurious damping effects of fluid in the conduits connecting the units 1 to the reservoir 3 are obviated. The system can be assembled as a complete sub-assembly in a factory, the correct gas/liquid mixture being introduced at the assembly stage.

Many variations are possible within the scope of the invention. For example, the diaphragm 15 could be moved by means other than the pressure varying device. The pressure of the liquid in the part of chamber 13 in the unit, could be varied by any suitable means, for example, a movable end closure which could take the form of a cap screwed on to the cylinder 8 or a plug which screws into the cylinder. Another possible modification is the inclusion of a spring within the cylinder to assist in the spring action of the unit.

Although the fluid within the chamber 11 of each suspension unit has been described above as a dispersion of gas in oil it will be appreciated that when the unit is not in use the gas and oil may separate.

The above-described suspension units have distinct advantages over known units which have a liquid chamber and gas chamber separated by a free piston. For example, separating piston friction and inertia are eliminated and there is a considerable cost saving due to elimination of the piston.

Although the suspension system is described above with particular reference to motor cycles, it is suitable for use on other vehicles, for example a wheel chair.

I claim:

1. A suspension unit comprising a cylinder, means defining a pressure space within said cylinder filled with a dispersion of a mixture of fixed masses of gas and liquid, said means including a selectively movable end wall, a damping piston working through said dispersion in said pressure space, a piston rod fast with said damping piston and extending sealingly through one end of said cylinder, and means for selectively varying the position of said end wall to adjust the pressure in said pressure space, wherein said end wall is constituted by a diaphragm.

2. A suspension system for a vehicle having a sprung part and an unsprung part, comprising a suspension unit having a cylinder for connection to one of said vehicle parts and a damping piston carrying a piston rod extending sealingly through one end of said cyclinder for connection to the other of said vehicle parts, a first pressure space within said unit filled with a dispersion of gas and liquid, said damping piston working through said dispersion of gas and liquid in said first pressure space, a second pressure space within said unit containing liquid, a diaphragm sealed at its periphery to said cylinder and separating said pressure spaces, and means for adjusting the pressure of the liquid in said second space to vary the position of said diaphragm and therefore the pressure in said first space.

3. A suspension system according to claim 2, wherein said cylinder has an end closure, said periphery of said diaphragm being secured between said cylinder and said end closure.

* * * * *